(12) United States Patent
Sutherland (10) Patent No.: US 10,621,519 B2
(45) Date of Patent: *Apr. 14, 2020

(54) METHOD AND APPARATUS OF TRACKING TIME WORKED IN A MULTI-TASKING ENVIRONMENT

(71) Applicant: KASEYA LIMITED, Dublin (IE)

(72) Inventor: Mark James Sutherland, Milpitas, CA (US)

(73) Assignee: KASEYA LIMITED, Dublin (IE)

( * ) Notice: Subject to any disclaimer, the term of this patent is extended or adjusted under 35 U.S.C. 154(b) by 163 days.

This patent is subject to a terminal disclaimer.

(21) Appl. No.: 15/854,603

(22) Filed: Dec. 26, 2017

(65) Prior Publication Data

US 2018/0121837 A1    May 3, 2018

Related U.S. Application Data

(63) Continuation of application No. 12/915,338, filed on Oct. 29, 2010, now Pat. No. 9,852,383.

(51) Int. Cl.
*G06F 15/02* (2006.01)
*G06Q 10/06* (2012.01)
*H04M 3/51* (2006.01)

(52) U.S. Cl.
CPC .......... *G06Q 10/06* (2013.01); *H04M 3/5175* (2013.01); *H04M 2201/12* (2013.01)

(58) Field of Classification Search
None
See application file for complete search history.

(56) References Cited

U.S. PATENT DOCUMENTS

| 6,771,766 B1* | 8/2004 | Shafiee | H04M 3/5191 |
| | | | 379/265.09 |
| 2006/0036487 A1* | 2/2006 | Mann | G06Q 30/0236 |
| | | | 705/14.36 |

* cited by examiner

*Primary Examiner* — Fateh M Obaid (57) ABSTRACT

A method and apparatus of maintaining time information for a multi-tasking customer service agent is disclosed. One example method of operation may include maintaining time information allocated to a plurality of tasks. The method may include receiving a first task and starting a first timer at a computing device corresponding to the beginning of work performed on the first task. The method may also include receiving a second task and starting a second timer different from the first timer, which corresponds to the beginning of work performed on the second task. The method may further include transferring a total time allocation record representing a total time counted by the first timer and a total time counted by the second timer to a data record stored in memory, wherein the data record associates the total time counted by the first timer with a corresponding task, and associates the total time counted by the second timer with a different corresponding task.

20 Claims, 7 Drawing Sheets

METHOD AND APPARATUS OF TRACKING TIME WORKED IN A MULTI-TASKING ENVIRONMENT

The instant application is a continuation of patent application Ser. No. 12/915,338, filed Oct. 29, 2010, entitled METHOD AND APPARATUS OF TRACKING TIME WORKED IN A MULTI-TASKING ENVIRONMENT, now issued U.S. Pat. No. 9,852,383, issued on Dec. 26, 2017, the entire contents of which is incorporated by reference herein. This invention also relates to a method and apparatus of providing a time tracking interface to a worker who performs multiple tasks in succession and/or simultaneously, and, more specifically, to an application that offers tools and options for agents to keep records of time spent on each task performed.

BACKGROUND OF THE INVENTION

Technical Field of the Invention

In the evolving technology world today, various computer-based information technology (IT) applications, advanced technology devices, and new technology products require constant technical support. Both at home and in the workplace, the need for competent, available and professional support services continues to grow as products and services continue to evolve with new and improved technology.

Most technical support services include a live agent who talks directly with a customer over the telephone or through a live online chat session. Other examples include automated recordings which can provide basic information and can reduce the amount of time spent between a customer and a live agent. Speaking directly with a live agent is expensive and can create financial burdens for corporations.

One way to reduce the costs and increase the efficiency associated with technical support, may be to offer the agent various interface tools to provide options for the agent to talk with more than one person at a time. The agent may also be assigned to complete more than one task at a time (multi-tasking), and answer more than one inquiry at a time. The typical agent has a headset microphone and speaker combination to allow the agent's hands to be free.

Other tools offered to agents would include a personal computer or other computing device that could be used to access customer records, account information, technical manuals, and provide a portal to communicate with online customers. The computer may also provide a medium for the agent to keep copious records of customer interactions for future reference and for internal management purposes.

Managers and business leaders must keep track of a customer support agent's time allocated to helping customers so that the agent's productivity can be observed for optimized work management procedures. One variable that may provide accurate productivity records may be a timeline or a record of the time spent on each task and/or with each customer. As agents become increasingly busy, the amount of time spent assisting customers may be increasingly difficult to track and record.

SUMMARY OF THE INVENTION

One embodiment of the present invention may include a method of maintaining time information allocated to a plurality of tasks. The method may include receiving a first task and starting a first timer at a computing device corresponding to the beginning of work performed on the first task. The method may also include receiving a second task and starting a second timer different from the first timer, which corresponds to the beginning of work performed on the second task. The method may further include transferring a total time allocation record representing a total time counted by the first timer and a total time counted by the second timer to a data record stored in memory, wherein the data record associates the total time counted by the first timer with a corresponding task, and associates the total time counted by the second timer with a different corresponding task.

Another example embodiment of the present invention may include an apparatus configured to maintain time information allocated to a plurality of tasks. The apparatus may include a receiver configured to receive a first task and a second task. The apparatus may also include a processor configured to start a first timer corresponding to the beginning of work performed on the first task, and configured to start a second timer different from the first timer, which corresponds to the beginning of work performed on the second task. The apparatus may further include a transmitter configured to transfer a total time allocation record representing a total time counted by the first timer and a total time counted by the second timer to a data record stored in memory, wherein the data record associates the total time counted by the first timer with a corresponding task, and associates the total time counted by the second timer with a different corresponding task.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
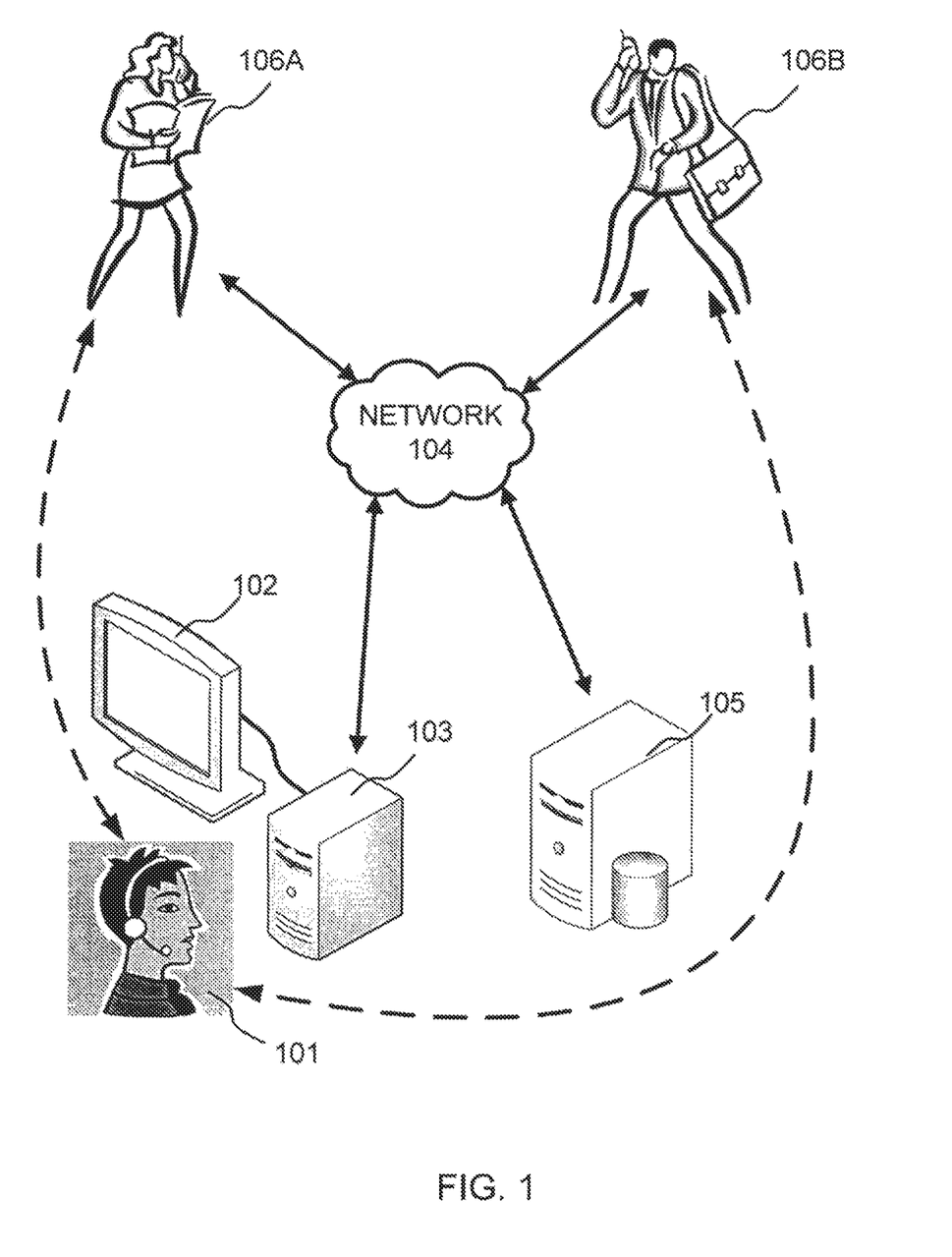
FIG. 1 illustrates an example network configuration, according to example embodiments of the present invention.

FIG. 1 illustrates an example communication network, according to example embodiments of the present invention. Referring to FIG. 1, a live agent 101 is situated in a working environment with a hands-free headset that provides flexibility to answer calls and work on a computer device. The live agent 101 is positioned near a computer display 102 which is coupled to a desktop or laptop computer 103. Alternatively, the desktop computer 103 may be a handheld computer with an integrated display.

A network 104 provides a backbone for short messaging service messages (SMS), email messages, digital voice calls, PSTN phone calls etc. The network 104 may include a local loop subscriber line, public switched telephone network (PSTN), a digital data network providing voice over Internet protocol (VoIP) and/or Internet access. Customers 106A and 106B represent two different customers which may be calling a service center to report a problem with their service or product (e.g., cable, Internet, computer support, software, hardware device troubleshooting, etc.).

In operation, a first user 106A may call the customer service department employing live agent 101. The user may be eventually connected directly to the live agent 101 via his or her telephone and/or through the agent's computer 103 or telephone. While assisting the first customer 106A, the agent 101 must maintain records of his or her time allocated to the customers to properly acknowledge the tasks performed throughout the day.

This time related task information may be used to provide feedback to the agent 101 from management, and may also provide offer promotions and advancements in career opportunities, and, may be used for internal billing procedures to bill the proper clients for time spent on certain tasks. Live agent data centers are commonly outsourced to remote countries. The agents may provide support for multiple different corporations and thus need to keep accurate records of their time spent on each task to ensure adequate business records.

Once the customer 106A is connected with the live agent 101, a timer must be started to keep track of the time spent on the present task. During the connection between the customer 106A and the live agent 101, another customer 106B may be connected to the live agent 101 simultaneously, or, the customer call may be placed in a queue operated by a database server 105. The live agent 101 may receive an acknowledgment of the second customer 106B via his or her phone system or through the display interface 102. The live agent 101 may be waiting for information to assist the first customer 106A, or, may be finished talking with the first customer 106A, and may decide to accept the call from customer 106B even though the agent 101 is still performing work on the first task.

Figure 2:
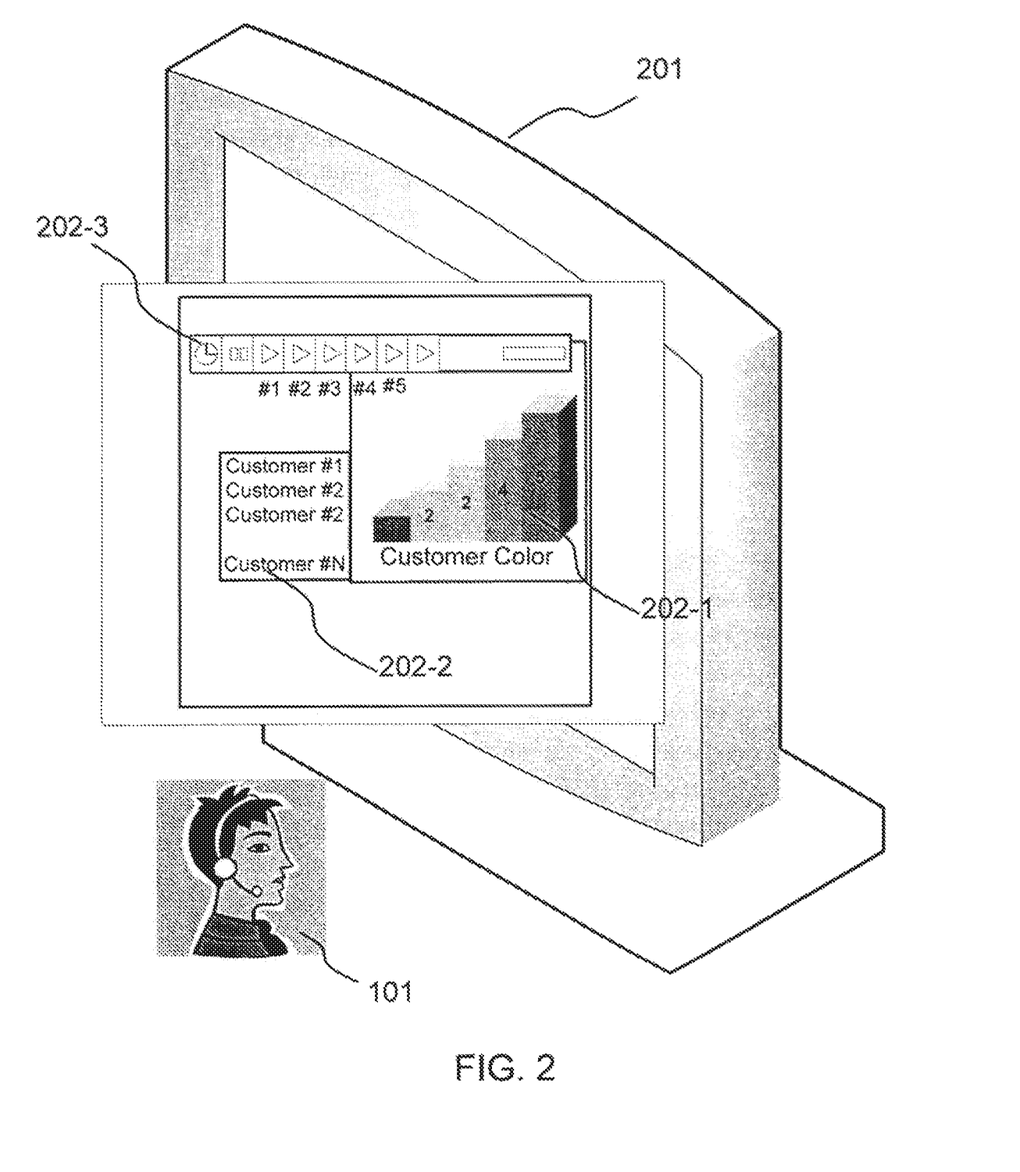
FIG. 2 illustrates an example agent interface, according to example embodiments of the present invention.

The live agent 101 must keep track of his or her time spent with each customer, writing down the time and keeping records of the starting and stopping of time spent with customers can be arduous and subject to human error. FIG. 2 illustrates an example graphical user interface (GUI) according to example embodiments of the present invention. Referring to FIG. 2, the display 201 provides the live agent 101 with a view of a customer time tracking application 202. The interface may include a unique set of customer colors for example a set of customers #1-#5 is presented at section 202-1. The customer numbers may be selected in the order that they are presented to the live agent 101 or at the live agent's discretion. A toolbar 202-3 may provide a time selection feature that corresponds to the time spent with each customer. The live agent 101 may start a particular timer (#1-#5) by pressing play or start on the colored button corresponding to the customer presently being assisted.

Figure 3:
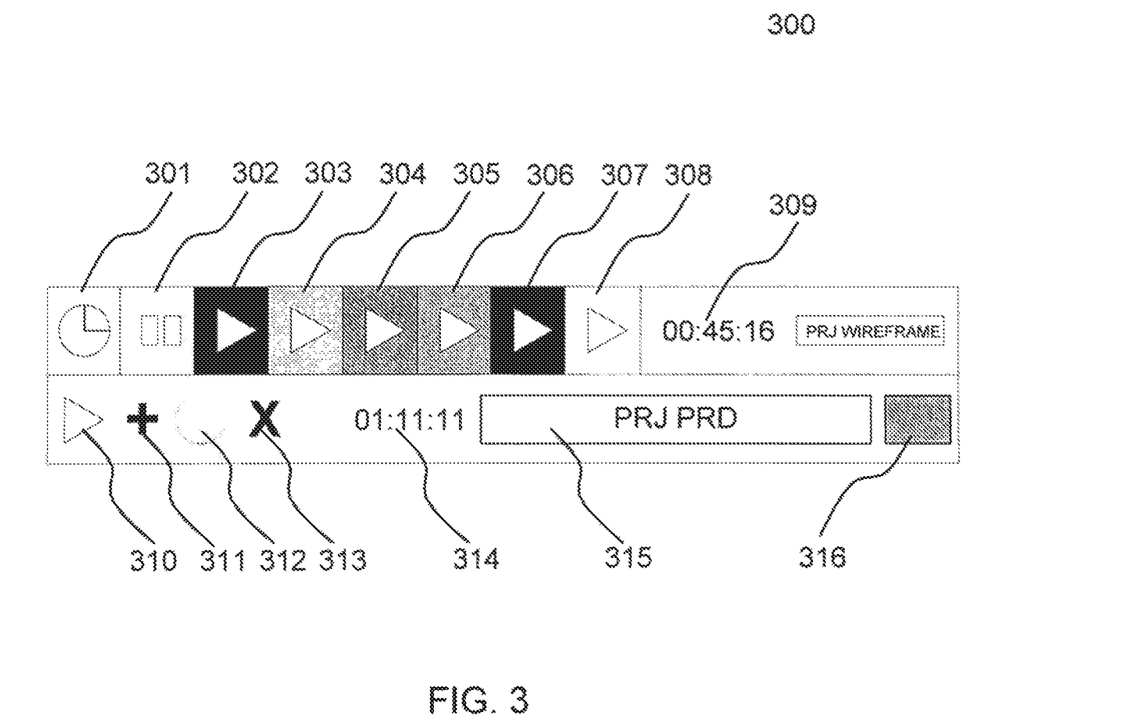
FIG. 3 illustrates an example timeline toolbar interface application, according to example embodiments of the present invention.

FIG. 3 illustrates a timer toolbar application, according to example embodiments of the present invention. Referring to FIG. 3, the multiple timers 303-308 may be started and stopped at any time corresponding to the live agent's present customer and/or task. The timers 303-308 may be created, started, stopped, and/or closed at any time. Creating a new timer may be performed with a single click of a button. The time spent on a particular task may be tracked and associated with a project, such as, a particular contract, billing procedure, task name and/or account. The task may be instantly associated with the project by selecting the project when the timer is first created/initiated. The association of the data may be performed at a later time and stored in a remote database.

In operation, the live agent 101 may initiate a timer for a first customer related task. When the agent 101 encounters another task or customer, the timer may be instantly paused on the first task manually by the agent's actions or automatically by the agent selecting a second timer for the second customer. Alternatively, if the agent is handling both tasks simultaneously, both timers may be active at the same time. A third task may create a predetermined task pausing operation that forces the first task to be paused since the agent's may not be permitted to perform three simultaneous tasks depending on the limitations imposed by the management.

FIG. 3 illustrates various different timers 303-308, according to example embodiments of the present invention. The presently selected timer may include time information 309 to indicate the amount of time spent on all of the pending tasks. A project name may be included to indicate the name of the project 315. A color window may be used to show the present timer and task being performed in window 316. A clock timer may be used to resume a present timer 301 and a pause timer 302 may be used to pause the present task. Additional features, such as, play 310, add 311, refresh 312 and remove 313 may provide easy shortcuts to create new timers and manipulate their operations. Another timer 314 may indicate the amount of time spent on a current task.

Figure 4:
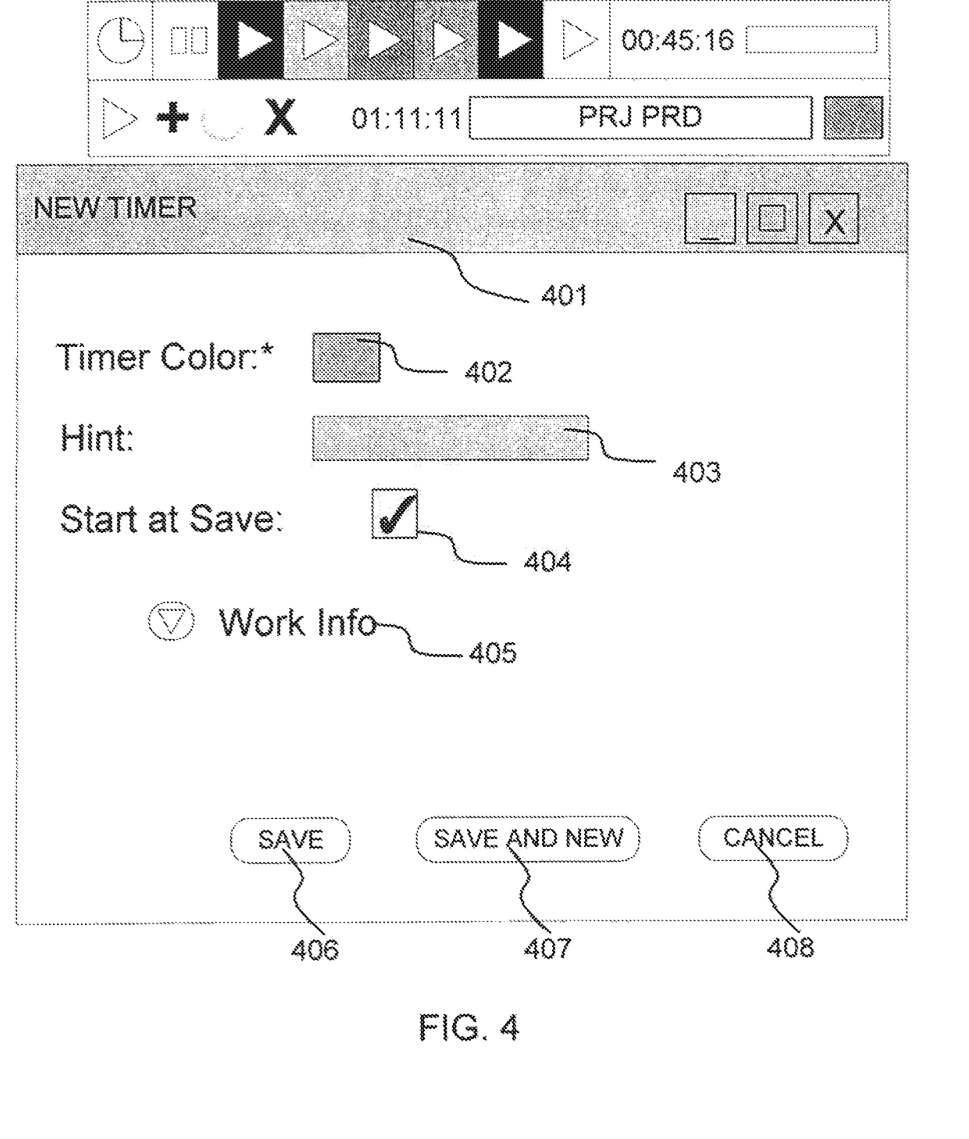
FIG. 4 illustrates an example new timer interface application, according to example embodiments of the present invention.

FIG. 4 illustrates a screenshot of a new timer setup interface, according to example embodiments of the present invention. A new timer menu heading is displayed in the new window 401. The new timer window may be loaded by a single button selection operation of the menu items in toolbar 300. A timer color 402 is offered for selection by the agent 101. The color displayed may be a new color not currently being used and/or the color may be modified per the agent's discretion. A "Hint" menu 403 may be offered to provide the agent with an opportunity to create a shortcut or data menu used to identify the task or customer associated with the new color. A "start at save" feature 404 may be selected by the agent to create an automatic save feature that saves information periodically once the timer is started. A separate work information button 405 may be used to view additional information related to the task. Finally, the new timer may be saved at menu option 406, or, saved and a new timer menu may be presented at menu option 407 or the operation may be cancelled by selecting menu option 408.

Figure 5:
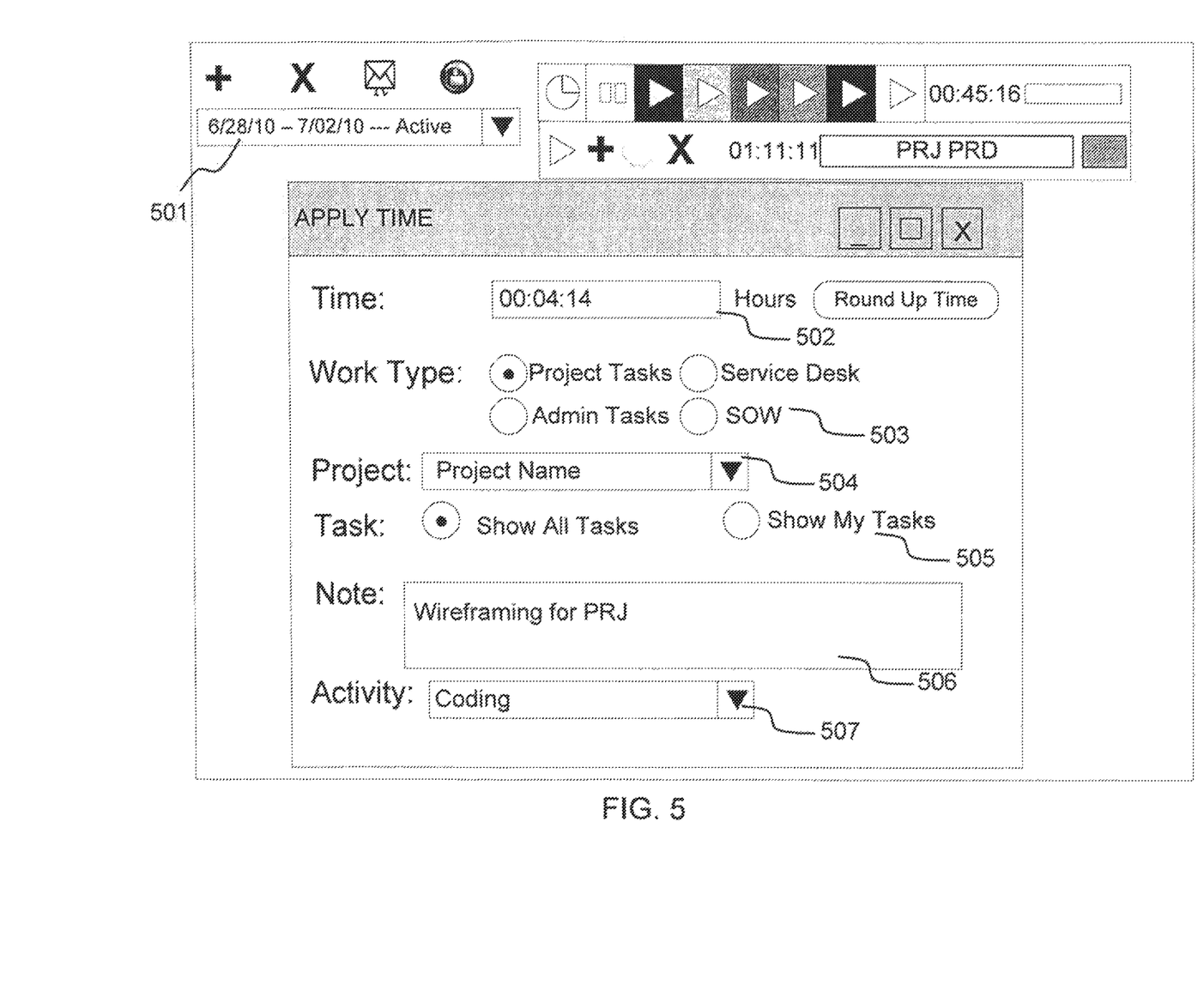
FIG. 5 illustrates another example timer interface application, according to example embodiments of the present invention.

FIG. 5 illustrates another example user interface, according to example embodiments of the present invention. Referring to FIG. 5, a time frame that includes multiple days may be accessed and viewed by the agent 101. A period of days represented by menu item 501 may be modified or viewed by selecting a drop down menu. The amount of time worked on a particular project for the stated period of time may be viewed at menu item 502. The type of work may be selected to correspond to the type of work being performed, such as, "project tasks" associated with specific projects at menu item 503. Predetermined projects may include tasks that are assigned to the agent 101 and the time spent on those tasks may be designated by selecting "project tasks" to identify the work performed.

FIG. 5 further illustrates other options, such as, project name 504, which may include a drop down menu to select any of the presently assigned agent projects which should be associated with the time worked. Another option may include viewing all tasks or just the tasks assigned to the agent at menu item 505. Notes may be made to correspond to the projects and time spent at menu option 506. The specific activity performed by the agent may also be designated for the time spent by the agent, such as, coding, support, Q&A, sales, etc., at menu option 507. The timesheet information generated may be sent to a central repository remote server where the agent's work efforts are linked to activity records for management record keeping.

Figure 6:
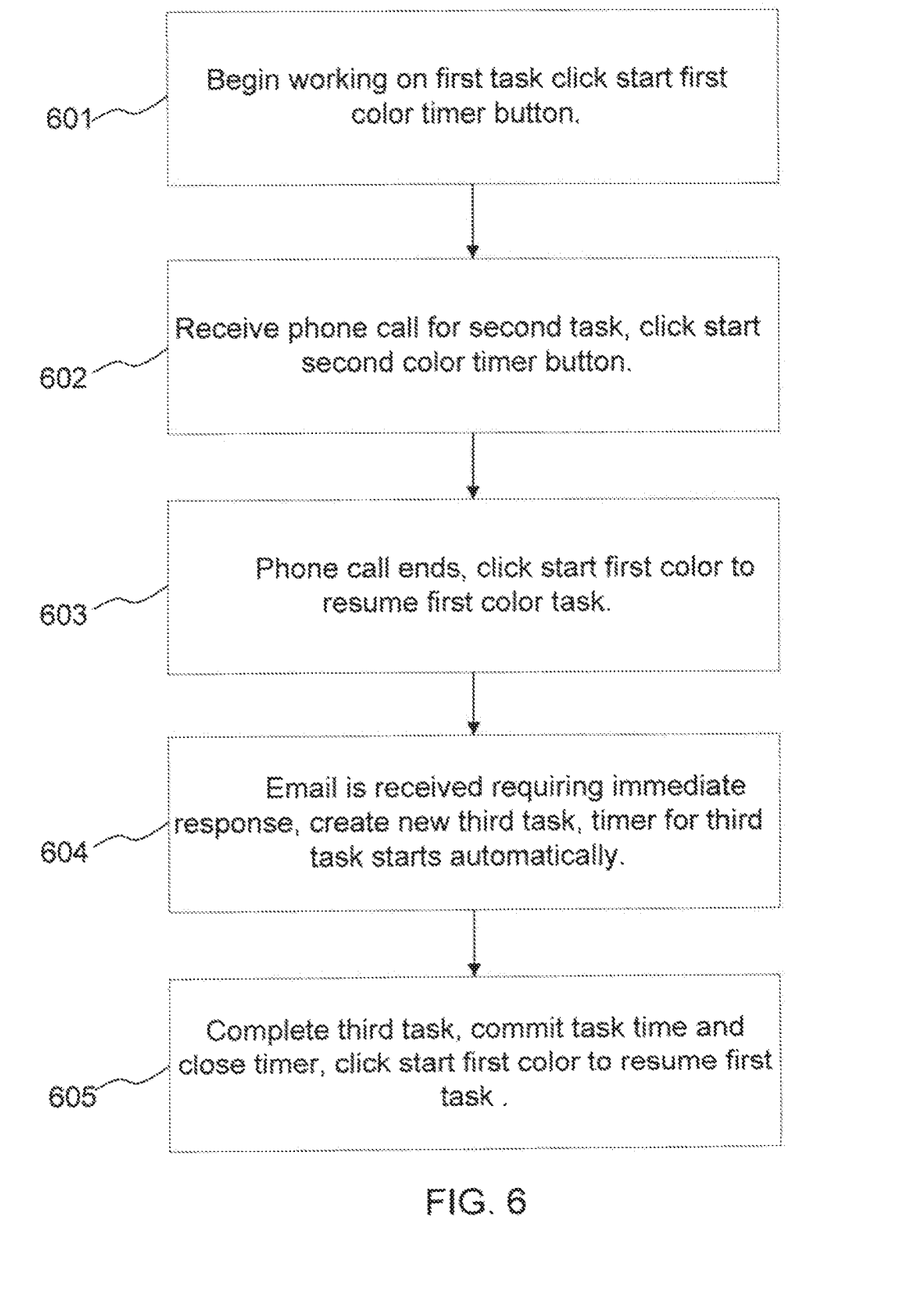
FIG. 6 illustrates an example method flow diagram, according to example embodiments of the present invention.

FIG. 6 illustrates an example method according to example embodiments of the present invention. Referring to FIG. 6, an agent 101 may begin working on a first task by selecting a specific color timer button to designate the first task and the time associated with the first task, at operation 601. According to one example, the agent 101 may receive a call initiating a second task and select a second color to start a timer for the second task on his or her user interface at operation 602. As the phone call for the second task expires, the first task may be re-selected to restart the first timer which was automatically paused when the second task was initiated, at operation 603. Alternatively, both clocks may be running simultaneously depending on the agent's present working condition and preference.

Next, an email may be received which requires an immediate response, receiving the email may automatically initiate a third task and a corresponding third timer to begin counting automatically, at operation 604. This third timer may be counting simultaneously with the second and/or third timer, may pause one and not the other timer, or, may pause both the first and second timers. Lastly, the third task may be completed and the task time may be committed to memory. The timer may be closed and the first color may be automatically re-started to resume the first task, at operation 605.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 7 illustrates an example network element 700, which may represent any of the above-described network components 102, 103, 104 and 105.

Figure 7:
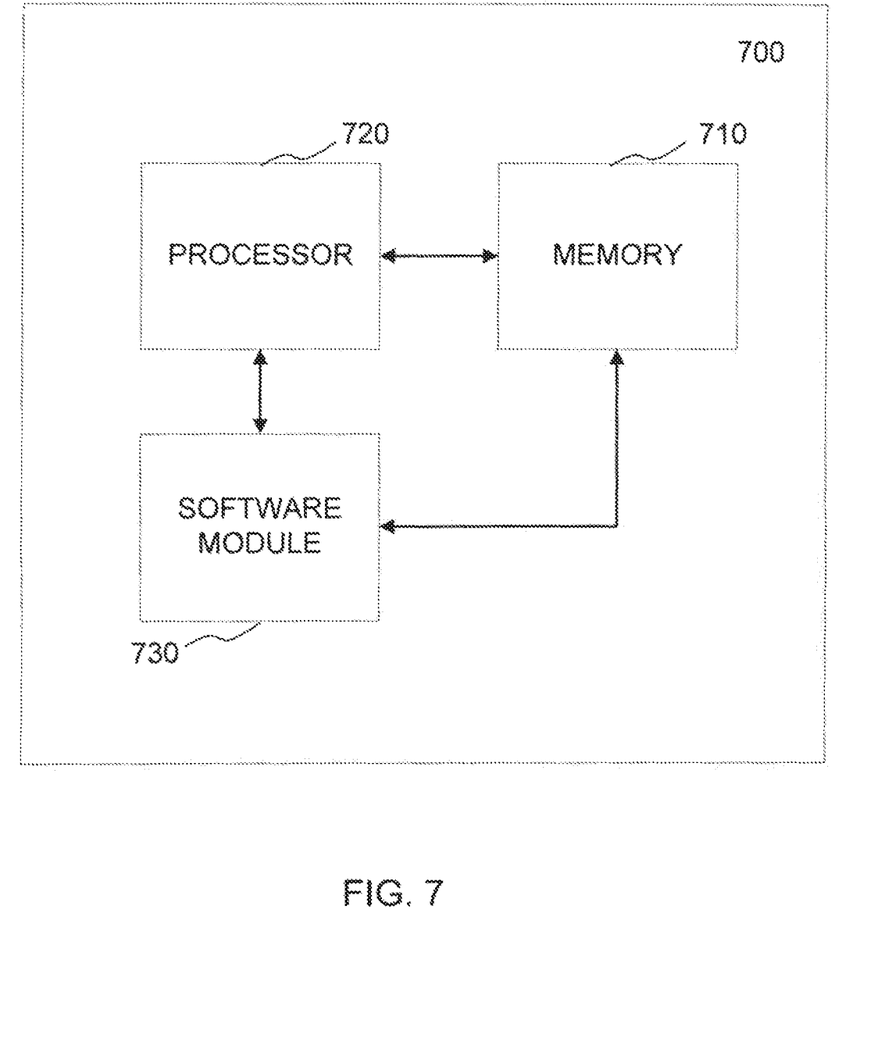
FIG. 7 illustrates an example network entity configured to store and execute any of the example applications described in the specification, according to example embodiments of the present invention.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. The computer readable medium may be a non-transitory computer readable medium that includes tangible hardware components in addition to software stored in memory. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of maintaining time information allocated to a plurality of tasks initiated during a live call, the method comprising:
   receiving a first task associated with a first call and starting a first timer at a computing device corresponding to a beginning of work performed on the first task, the first timer being started automatically responsive to a customer call device being connected with a live agent call processing device;
   receiving a second task associated with a second call and starting a second timer different from the first timer, which corresponds to the beginning of work performed on the second task, the second timer being started responsive to the second task being initiated by the live agent's call processing device, and wherein the second timer starting automatically pauses the first timer;
   operating both the first timer and the second timer simultaneously and automatically ending the first timer via the agent call processing device when the first task is completed and automatically ending the second timer via the agent call processing device when the second task is completed; and automatically transferring a total time allocation record representing a total time counted by the first timer and a total time counted by the second timer to a data record stored in memory of the agent's call processing device, wherein the data record associates the total time counted by the first timer with the first task, and associates the total time counted by the second timer with the second task.

2. The method of claim 1, comprising displaying a first visual indicator in a user interface of the live agent call processing device corresponding to the first call and displaying a second visual indicator in the user interface of the live agent call processing device corresponding to the second call.

3. The method of claim 1, comprising receiving a second call and placing the second call in a queue while the first timer is operating.

4. The method of claim 1, further comprising receiving a third task and starting a third timer that is different from the first timer and the second timer, the third timer corresponding to the beginning of work performed on the third task.

5. The method of claim 4, further comprising:
assigning the first task a first color indicator;
assigning the second task a second color indicator different from the first color indicator; and
assigning the third task a third color indicator different from the first color indicator and the second color indicator.

6. The method of claim 4, wherein the first task, the second task and the third task are received as at least one of a phone call, an email, and a text message.

7. The method of claim 1, further comprising resuming the first timer when the second task is completed.

8. An apparatus configured to maintain time information allocated to a plurality of tasks initiated during a live call, the apparatus comprising:
a receiver configured to receive a first call associated with a first task and a second call associated with a second task;
a processor configured to
start a first timer corresponding to a beginning of work performed on the first task,
start a second timer different from the first timer, which corresponds to the beginning of work performed on the second task, the first timer being started automatically responsive to a customer call device being connected with a live agent call processing device, the second timer being started responsive to the second task being initiated by the live agent's call processing device, and wherein the second timer starting automatically pauses the first timer,
operate both the first timer and the second timer simultaneously and automatically end the first timer via the agent call processing device when the first task is completed and automatically ending the second timer via the agent call processing device when the second task is completed; and
a transmitter configured to automatically transfer a total time allocation record representing a total time counted by the first timer and a total time counted by the second timer to a data record stored in memory of the agent's call processing device, wherein the data record associates the total time counted by the first timer with the first task, and associates the total time counted by the second timer with the second task.

9. The apparatus of claim 8, comprising a display comprising a user interface which receives and displays a first visual indicator corresponding to the first call and displays a second visual indicator in the user interface corresponding to the second call.

10. The apparatus of claim 8, wherein the second call is placed in a queue while the first timer is operating.

11. The apparatus of claim 8, wherein a third task is received and a third timer is started that is different from the first timer and the second timer.

12. The apparatus of claim 11, wherein the third timer corresponding to the beginning of work performed on the third task.

13. The apparatus of claim 11, wherein the first task is assigned a first color indicator, the second task is assigned a second color indicator different from the first color indicator, and the third task is assigned a third color indicator different from the first color indicator and the second color indicator.

14. The apparatus of claim 11, wherein the first task, the second task and the third task are received as at least one of a phone call, an email, and a text message.

15. A non-transitory computer readable storage medium comprising instructions that when executed cause a processor perform maintaining time information allocated to a plurality of tasks initiated during a live call, the processor being further configured to perform:
receiving a first task associated with a first call and starting a first timer at a computing device corresponding to a beginning of work performed on the first task, the first timer being started automatically responsive to a customer call device being connected with a live agent call processing device;
receiving a second task associated with a second call and starting a second timer different from the first timer, which corresponds to the beginning of work performed on the second task, the second timer being started responsive to the second task being initiated by the live agent's call processing device, and wherein the second timer starting automatically pauses the first timer;
operating both the first timer and the second timer simultaneously and automatically ending the first timer via the agent call processing device when the first task is completed and automatically ending the second timer via the agent call processing device when the second task is completed; and
automatically transferring a total time allocation record representing a total time counted by the first timer and a total time counted by the second timer to a data record stored in memory of the agent's call processing device, wherein the data record associates the total time counted by the first timer with the first task, and associates the total time counted by the second timer with the second task.

16. The non-transitory computer readable medium of claim 15, wherein the processor is further configured to perform displaying a first visual indicator in a user interface of the live agent call processing device corresponding to the first call and displaying a second visual indicator in the user interface of the live agent call processing device corresponding to the second call.

17. The non-transitory computer readable medium of claim 15, wherein the processor is further configured to perform receiving a second call and placing the second call in a queue while the first timer is operating.

18. The non-transitory computer readable medium of claim 15, wherein the processor is further configured to perform receiving a third task and starting a third timer that is different from the first timer and the second timer, the third timer corresponding to the beginning of work performed on the third task.

19. The non-transitory computer readable medium of claim 18, wherein the processor is further configured to perform:
    assigning the first task a first color indicator;
    assigning the second task a second color indicator different from the first color indicator; and
    assigning the third task a third color indicator different from the first color indicator and the second color indicator.

20. The non-transitory computer readable medium of claim 18, wherein the first task, the second task and the third task are received as at least one of a phone call, an email, and a text message.

\* \* \* \* \*